April 19, 1960  E. O. LAWRENCE ET AL  2,933,442
ELECTRONUCLEAR REACTOR
Filed July 11, 1958  6 Sheets-Sheet 1

INVENTORS.
ERNEST O. LAWRENCE
EDWIN M. McMILLAN
LUIS W. ALVAREZ
BY Roland A. Anderson
ATTORNEY.

April 19, 1960    E. O. LAWRENCE ET AL    2,933,442
ELECTRONUCLEAR REACTOR

Filed July 11, 1958    6 Sheets-Sheet 2

INVENTORS.
ERNEST O. LAWRENCE
EDWIN M. McMILLAN
BY LUIS W. ALVAREZ

Roland A. Anderson
ATTORNEY.

INVENTORS.
ERNEST O. LAWRENCE
EDWIN M. MCMILLAN
LUIS W. ALVAREZ
BY
ATTORNEY.

INVENTORS.
ERNEST O. LAWRENCE
EDWIN M. McMILLAN
LUIS W. ALVAREZ
BY
Roland A. Anderson
ATTORNEY.

INVENTORS.
ERNEST O. LAWRENCE
EDWIN M. MCMILLAN
LUIS W. ALVAREZ

BY

ATTORNEY

United States Patent Office 2,933,442
Patented Apr. 19, 1960

2,933,442

ELECTRONUCLEAR REACTOR

Ernest O. Lawrence, Edwin M. McMillan, and Luis W. Alvarez, Berkeley, Calif., assignors to the United States of America as represented by the United States Atomic Energy Commission Application July 11, 1958, Serial No. 748,093

6 Claims. (Cl. 204—193.2)

The present invention relates to linear accelerators for charged particles and, more particularly, to an electronuclear reactor.

This application is a continuation-in-part of our copending application Serial No. 571,850, filed March 15, 1956, and now abandoned.

With the increasing demand for commercially adequate quantities of materials which must be produced artificially by nuclear reactions, economically feasible methods and apparatus for obtaining production quantities of such materials are required. In consideration of such requirement, it is to be noted that a linear accelerator is capable of accelerating charged particles to high energy and is useful, by directing the accelerated particles upon a suitable target material, for obtaining certain nuclear reactions. As presently developed, linear accelerators are classed as laboratory tools for research purposes because the beam current is limited to a substantially low value. Thus, for production of commercial quantities of artificially produced materials with a linear accelerator, it is required that the accelerator have a high-current, high-energy beam.

Linear accelerators comprise, in general, a source of charged particles which provides a beam having an initial velocity and which directs such beam into a resonant cavity. The resonant cavity is excited to provide a longitudinally extended radio-frequency electric field ($TM_{010}$). Particles so directed into such cavity are accelerated during a portion of a cycle of the excitation electric field and are also decelerated during another portion. To shield the particles from the deceleration portion of the field a plurality of drift tubes are disposed in spaced-apart relation along the path of the particles within the cavity. Thus, during the time the particles are traversing the gap between the drift tubes, the electric field influences the motion of the particles to provide acceleration, while the drift tubes provide an electric field-free path for the particles during the decelerating portion of the electric field. For successive acceleration of particles to high energy the length of the drift tubes, as well as the gaps between adjacent tubes, increases successively from the source end of the cavity so that the increase in particle velocity does not cause the particle to arrive at the following gap during the decelerating portion of the excitation cycle.

It is well known that the accelerated particles in a linear accelerator, as described in the above paragraph, are subjected to defocusing forces in the accelerating electric fields between the drift tubes when the particles are being accelerated during the positive-going portion of the excitation field. It is also well known that the accelerated particles are not subjected to defocusing forces when acceleration occurs during the decreasing portion of the excitation field; however, another undesirable effect occurs which results in the particles falling out of phase with the field at the gaps between drift tubes; that is, radial focusing occurs and with it phase instability. Thus it is apparent that radial focusing and phase stability are not obtainable at the same time in such a linear accelerator.

Various methods and devices of overcoming radial defocusing have been utilized and chief among them is the placement of grids or foils across the entrance end of each of the drift tubes to provide a suitably conformed electric field between drift tubes and thus minimize the defocusing forces.

Where large current beams of particles are accelerated, such focusing grids or foils have disadvantages in that a certain amount of the beam is lost at the grids or foils and the heat developed by the beam striking the grids or foils results in the destruction thereof. A new approach to the required focusing problem is provided in the present invention by establishing a magnetic field extending parallel to the path of the particles and having a magnetic field strength of sufficient value to overcome the defocusing forces of the electric field. Such magnetic field establishes forces upon the particles which cause any particles having a radial component of motion to move in a helical path through the resonant cavity, rather than continue to diverge and be lost as a part of the useful beam.

Along with the above-discussed element (linear accelerator) of the present invention, there is provided another principal element which is a target and combination of such elements provides an electronuclear reactor. The latter element comprises, in general, a primary target for converting the beam of charged particles into a stream of very high energy neutrons, a secondary target for multiplying the energetic neutrons into a stream of less energetic neutrons, and a neutron adsorbing lattice of selected material with which the less energetic neutrons react for producing a desired artificial element or isotope in quantity. Lattice is herein defined as a structure of discrete bodies of selected fertile material, e.g., depleted natural uranium, and moderating material, e.g., water, arranged in a regular geometrical pattern.

When the beam of charged particles is directed upon the primary target a very great amount of heat is produced. With a beam current of the value of that of the present invention it has been determined by past experience with coolant methods as used in industry that such amount of heat cannot be adequately dissipated. To overcome the heat problem the area of the primary target facing the beam of charged particles is enlarged and the beam itself is deflected by a precessor over the face of the target in a continuously moving manner.

It is therefore an object of the invention to provide an electronuclear reactor.

Another object of the invention is to provide a production reactor controlled by an accelerated beam of charged particles.

A further object of the invention is to provide a reactor having an accelerated beam of charged particles directed upon target means for obtaining large quantities of artifically produced materials by nuclear reactions.

Still another object of the invention is to provide a new and improved linear accelerator for charged particles.

A still further object of the present invention is to provide a linear accelerator having electromagnetic focusing of the beam of charged particles.

Another important object of the invention is to provide a new and improved drift tube for a linear accelerator.

Still another object of the invention is to provide a drift tube for a linear accelerator having an axial magnetic field.

Further objects and advantages of the invention will be apparent in the following description and claims considered together with the accompanying drawing, in which Figure 1 is a longitudinal section of an electronuclear reactor;

Figure 1:
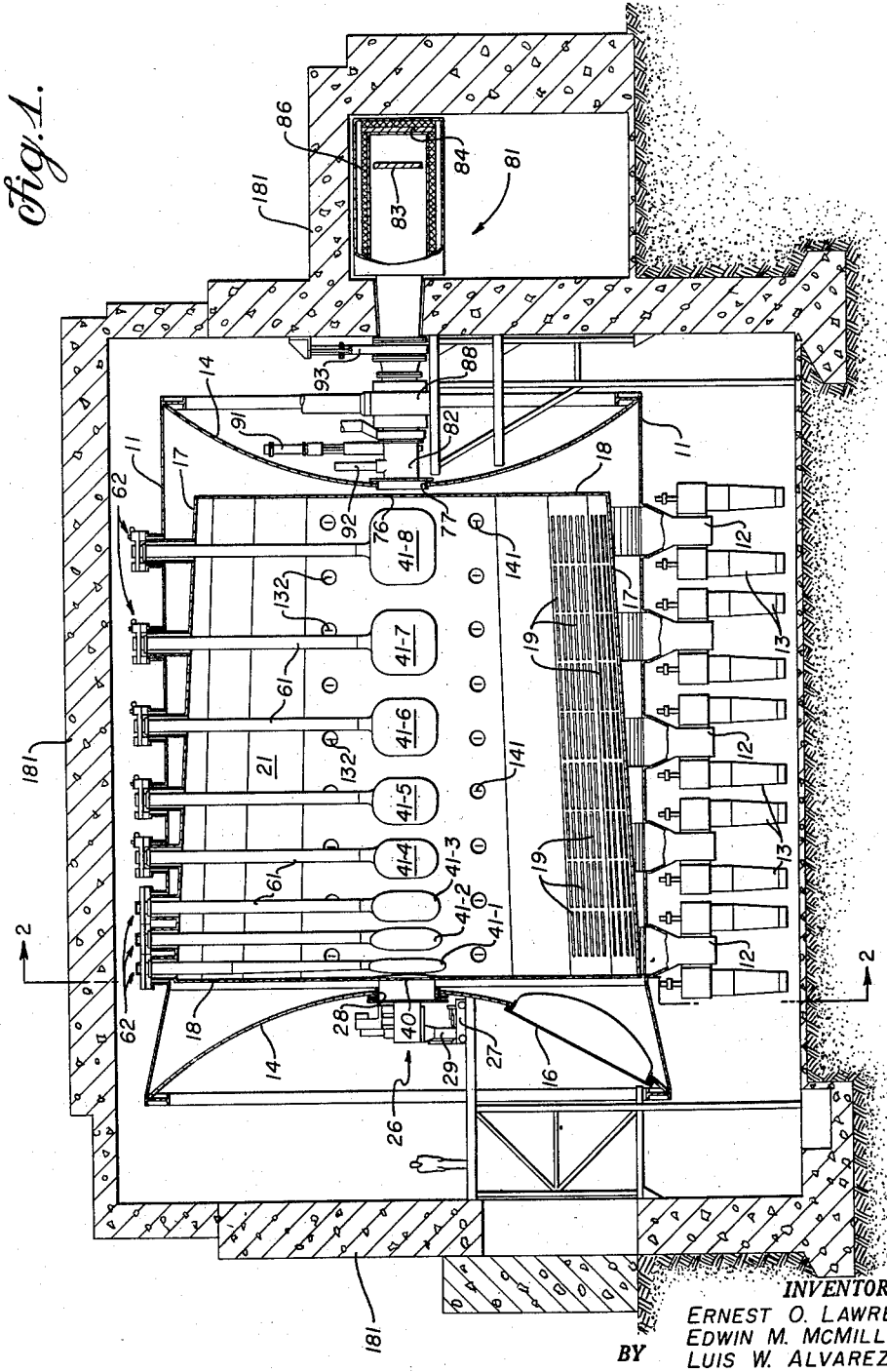

Referring to the drawing in detail, Fig. 1 in particular, there is provided an air-tight tank 11 having exhaust manifolds 12 to which a plurality of vacuum pumps 13 are connected. Because of the pressure to which the tank 11 is subjected by evacuation, the end closure plates 14 are each curved inwardly. One of the closure plates 14 is provided with an access door 16 which opens to permit entrance into the tank 11.

A cylindrical liner 17 having end plates 18 is suitably mounted in the tank 11 in insulated relation. Such liner 17 extends substantially the entire length of the tank 11 between the closure plates 14 and is provided with a plurality of substantially small slots 19 so that evacuation of the cavity formed by the liner 17 and end plates 18 is accomplished through action of the vacuum pumps 13. The inner surfaces of the liner 17 and end plates 18 are of an electrically conducting material, such as copper, and are polished to as smooth a surface as possible to minimize electrical losses. Thus there is provided a resonant cavity 21 within the tank 11. For convenience and best utilization of space, the resonant cavity 21 is disposed coaxially with respect to the tank 11. Because of the high values of current at the inner surfaces of the resonant cavity 21 during excitation thereof considerable heat is developed and, to prevent damage to the liner 17 and end plates 18, both such structures are provided with a suitable network of copper tubes (not shown) through which cooling water is passed.

An ion injector 26 is provided externally of the tank 11 and is mounted on a carriage 27 which permits movement of the injector to and from the central area of one closure plate 14 of the tank. An opening 28 in the central area of the closure plate 14 is adapted to receive in a conventional pressure-sealed manner (see Fig. 4) the output of the ion injector 26. To prevent loss of vacuum pressure during removal or connection of the ion injector 26, the injector is provided with a separate vacuum system 29 and with a gate 31 (see Fig. 4). Likewise, a gate 32 (see Fig. 4) is mounted on the closure plate 14 in operable relation with the opening 28.

Figure 4:
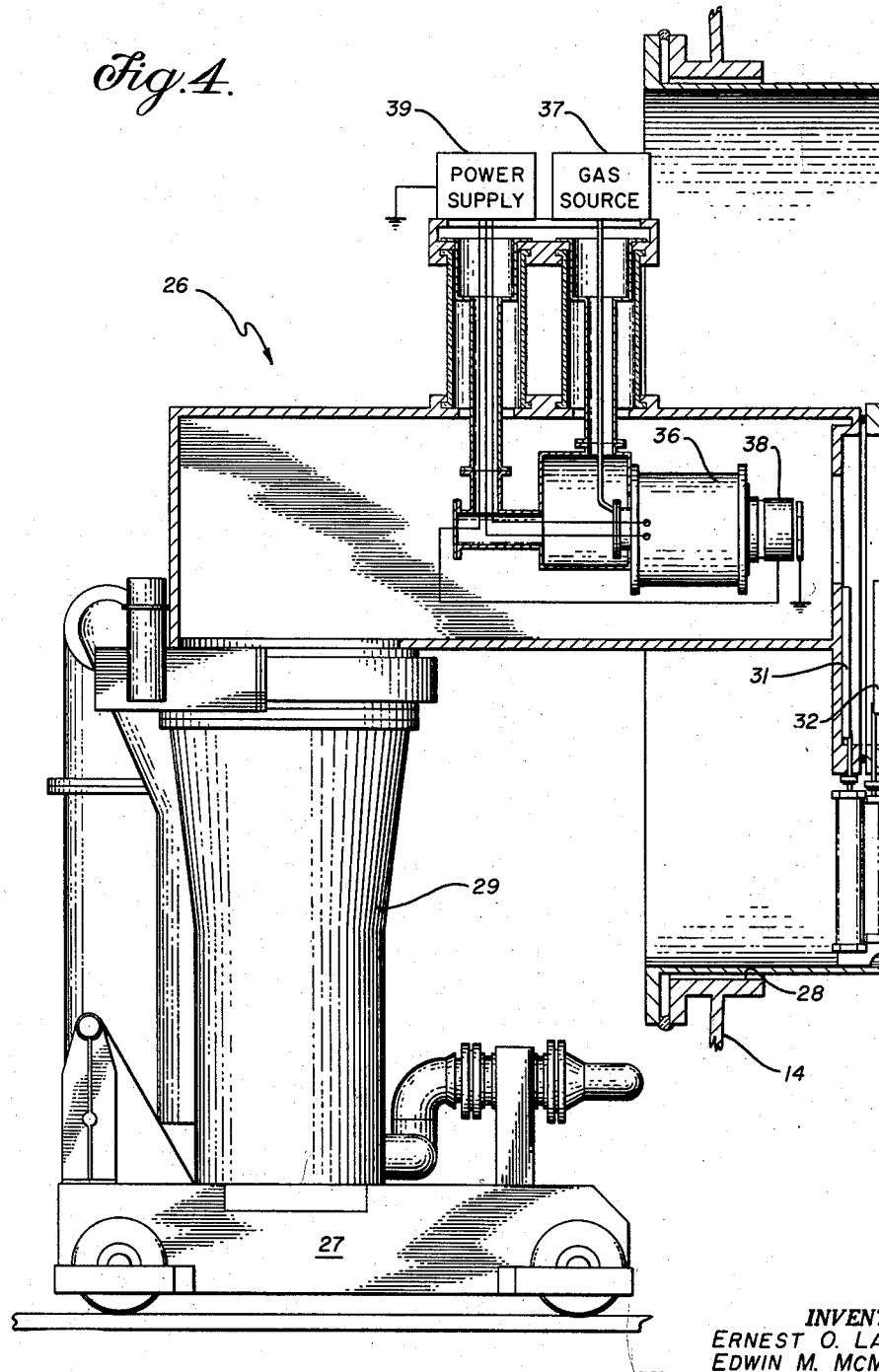
Figure 4 is a view, partly in section and schematic, of the ion injector of Fig. 1.
Figure 5:
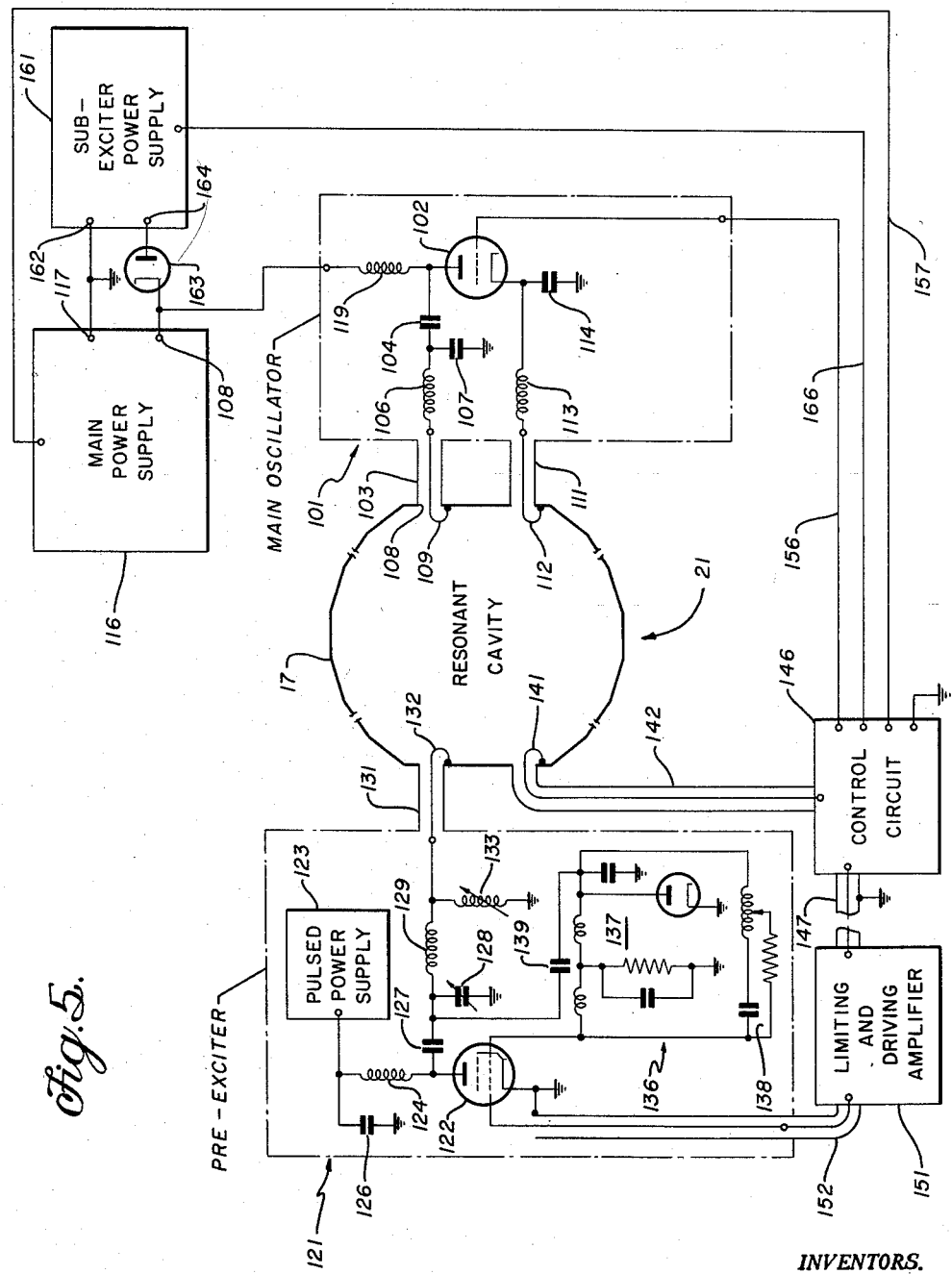
Figure 5 is a schematic block diagram of a control system for the electronuclear reactor of Fig. 1.

The ion injector 26 is conventional and comprises, in general, an arc type ion source 36 with a source 37 of gas to be ionized connected thereto, accelerating electrode structure 38, and a power supply 39 (see Fig. 4). An ion source of the above-referenced type is disclosed in detail in the copending application for U.S. Letters Patent, Serial Number 297,629, filed July 8, 1952, by John S. Foster, Jr., now Patent No. 2,806,161. The power supply 39 provides suitable potentials for operation of the ion source 36 and accelerating electrtodes 38. With an opening 40 in the end plate 18 of the resonant cavity 21 aligned with the opening 28, a beam of ions is directed from the ion injector 26 linearly along the axis of the cavity.

A plurality of drift tubes, 41–1 to 41–8, are disposed axially with respect to the resonant cavity 21 and in spaced-apart relation along the axis thereof. Such drift tubes, 41-1 to 41-8, have graded lengths and graded diameters of the opening and are mounted successively with the drift tube 41–1 having the shortest length and smallest opening positioned adjacent the injector end of the resonant cavity 21. Also, the spacing between successive drift tubes 41–1 to 41–8, increases in the direction away from the ion injector 26. The referenced dimensions of the drift tubes, 41–1 to 41–8, as well as the dimension of the spacing between the drift tubes, are readily calculated by using formulae which are well known in the art of linear accelerators.

Figure 3:
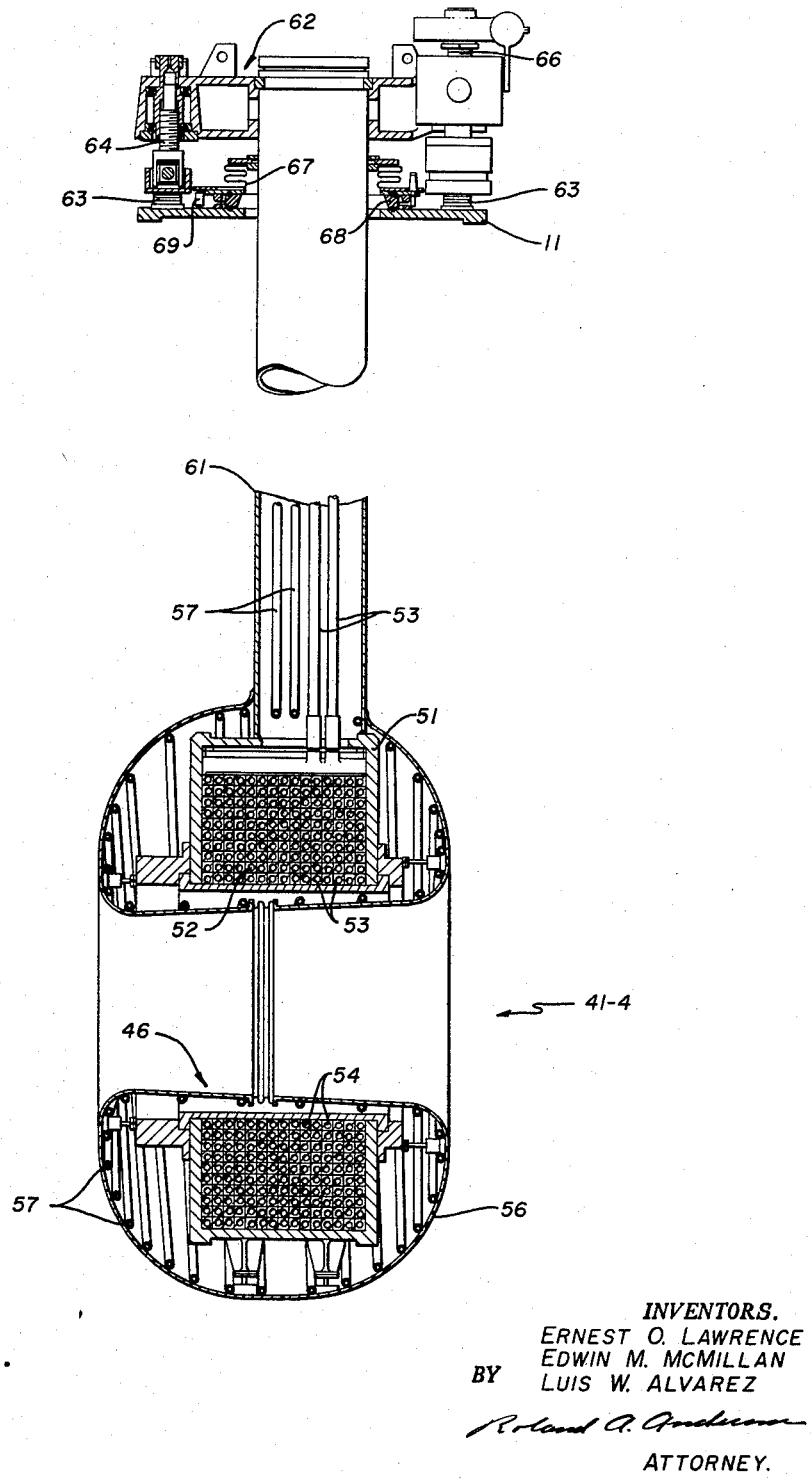
Figure 3 is a longitudinal section of a drift tube of Fig. 1.

As stated previously, known focusing devices utilized with the drift tubes of linear accelerators are not satisfactory for a production type accelerator. To accomplish the required ion focusing during acceleration of the ions, each of the drift tubes, 41–1 to 41–8, is provided with a solenoidal electromagnet 46 (see Fig. 3) having the axis thereof coincident with the axis of the ion beam. With a direct current flowing through the solenoid a magnetic field is established which, for consideration of the focusing effect, has three separate portions; e.g., (1) a magnetic field predominantly radial with respect to the axis at the entrance to the drift tube, (2) a magnetic field predominantly parallel to the axis through the bore of the drift tube, and (3) a magnetic field at the exit of the drift tube exactly the same in magnitude as that at the entrance, but with an opposite direction vectorially. Now, consider a charged particle approaching the drift tube while moving in a straight path which is substantially parallel to the axis, but at a distance from the axis which is less than the radius of the bore of the drift tube. As the charged particle enters the radial magnetic field, first described, the particle experiences a force which is mutually perpendicular to the magnetic field and the component of the particle's velocity perpendicular to the magnetic field. Since such magnetic field is radial, the particle is given an angular velocity by such force. After traversing the magnetic field at the entrance of the drift tube, the particle is next influenced by the second-described magnetic field where the initial velocity of the particle is essentially parallel with the magnetic field, but because of the acquired angular velocity the particle experience a force toward the axis of the drift tube which results in a radial velocity and the particle spirals toward the axis as well as moves through the bore of the drift tube. As the particle now enters the influence of the third magnetic field described a force is exerted which cancels the angular velocity acquired in the first magnetic field described. Thus, the net effect of the solenoidal electromagnet 46 is to impart a radial velocity to the ion beam which is directed toward the axis. By controlling the magnetic field intensity, it is readily apparent that the inherent radial defocusing forces due to accelerating field forces and space charge forces are overcome and overall focusing achieved.

Each of the drift tubes, 41–1 to 41–8, is similarly constructed, varying only in the dimensions of the components, and only one is described in detail hereinafter. A steel magnet case 51, having an annular configuration, is provided to contain the solenoidal magnet winding 52 comprising a plurality of turns of square copper conductor 53 capable of carrying a large value of current. Because of the large current it is necessary to dissipate the heat developed and such dissipation is readily accomplished by passing cooling water through a central opening 54 extending the length of the conductor 53. A copper shell 56 surrounds the magnet case 51 and is smoothly contoured in a rounded manner to prevent the concentration of high value electrical fields. The shell 56 is maintained in spaced-apart relation with respect to the magnet case 51 in a conventional manner (not shown) and is provided with copper cooling tubes 57, mounted on the interior surface, through which water is coursed.

For suspension of the drift tube 41 within the resonant cavity 21 a hollow copper-plated steel stem 61 is provided with one end extended through the shell 56 and rigidly affixed to the magnet case 51. An electrical contact is made between the shell 56 and the stem 61 by smoothly contouring the shell to such a juncture. The other end of the stem 61 extends upward through the wall of the liner 17 and through the tank 11 where termination is provided in an adjustable tripod support spider 62. Such spider 62 is mounted on insulators 63 which, in turn, are suitably mounted on the tank 11. To provide proper alignment of the drift tube 41 in the resonant cavity 21, adjustable support screws 64, 66 are included between the spider 62 and insulator 63. A bellows 67 is mounted concentrically with the stem 61 and affixed at one end to the stem in an air-tight relation. The bellows 67 is also mounted on the tank 11 in an air-tight manner and suitably insulated therefrom as by an insulator ring 68. Radio-frequency bypass capacitors 69 are mounted between the bellows 67 and the tank 11 to provide a low impedance path for radio-frequency voltages induced in the drift tube and stem structure.

Both ends of the conductor 53 of the magnet winding 52 are extended through the drift tube stem 61 to a point external to the tank 11. Also, the cooling tubes 57 are extended through the stem 61. Suitable cooling water lines are connected from a source (not shown) to both the conductor 53 and the tubes 57. Separate vacuum pumps (not shown) are connected to the stem 61 to substantially equalize the pressure on either side of the drift tube shell 56.

Centrally disposed exit openings 76, 77 in the end plate 18 of the liner 17 and the closure plate 14 of the tank 11, respectively, are provided adjacent to the drift tube 41-8, furthermost from the ion injector 26, and aligned with the opening in such drift tube. To receive the ion beam as it emerges from the exit openings, 76, 77, a target vessel 81 is provided and disposed with the axis thereof in alignment with the axis of the tank 11 and liner 17. A cylindrical section 82 is mounted between tank 11 and the target vessel 81 and is sealed in an air-tight manner about the opening 77 and similarly to the target vessel. In such a manner the vacuum pumps 13 of the tank 11 also pump out the target vessel 81 and the cylindrical section 82.

Within the target vessel 81 there is disposed a primary target 83 which is suitably mounted transverse to the axis and the path of the beam. Primary target 83 is fabricated from a suitable material which will undergo various nuclear reactions (e.g., evaporation, spallation, and stripping reactions) with the incident accelerated beam particles resulting in the production of high energy neutrons. Suitable target materials accordingly are natural uranium, thorium, or the like, and for structural and cooling purposes the target is best constructed as a plurality of plate elements of the desired target material contained in suitably disposed cooling tubes (not shown) with a liquid coolant passed therethrough. However, with the beam directed upon the primary target 83 for a prolonged period of time the amount of heat generated is sufficient to result in melting of the target material, even with cooling. To overcome such problem a precessor 88 is provided at the cylindrical section 82 to move the beam over the face of the primary target 83. Such precessor 88 comprises structure which establishes a moving magnetic field transverse to the path of the ion beam and so results in a continuously varying deflection of the beam. A precessor for accomplishing the foregoing is described in detail in the copending application for U.S. Letters Patent, Serial No. 563,163, now abandoned, filed February 2, 1956, by William M. Brobeck.

Figure 6:
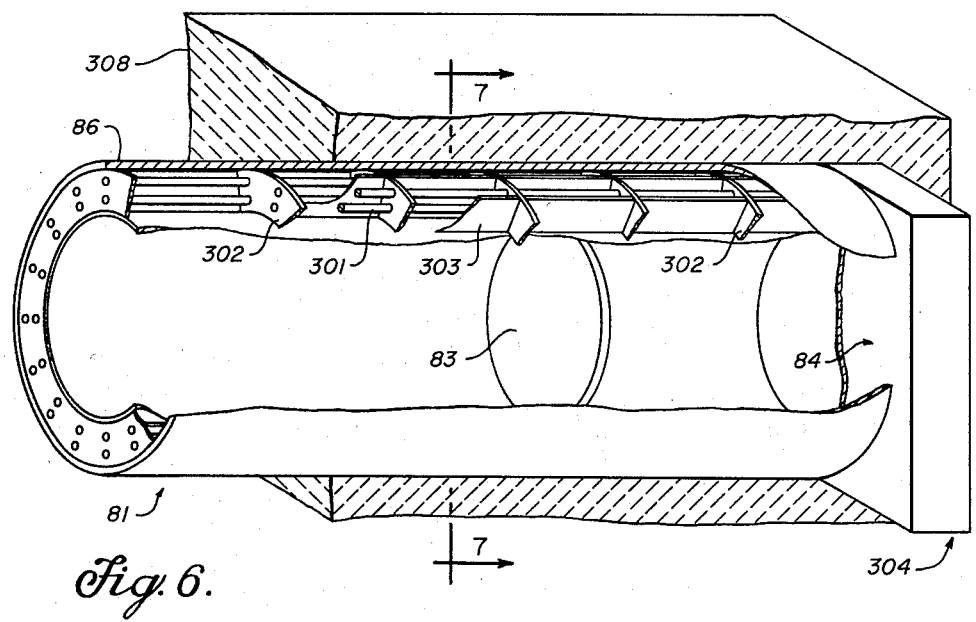
Figure 6 is a broken out perspective view partially in section of the target vessel of Fig. 1.

Spaced apart from the primary target 83 in the direction of beam travel is a secondary target 84 suitably mounted in parallel relation with the primary target (see Fig. 6). Secondary target 84 is preferably disposed exteriorly of target vessel 81 to facilitate its ready removal without disruption of the vacuum established within such target vessel and the communicating accelerator tank 11. Target 84 is accordingly mounted in coaxial juxtaposition with the end closure face of target vessel 81. Secondary target 84 is similar in construction to primary target 83 and may therefore best be constructed as a plurality of plate elements of suitable target material contained in cooling tubes (not shown) through which is passed a liquid coolant. Suitable secondary target materials include uranium, thorium, and other materials capable of producing an increased quantity of free neutrons through spallation reactions with the incident high energy neutrons produced at primary target 83. Of the various suitable secondary target materials, uranium depleted to 0.3% $U^{235}$, has been proven in practice to be most efficient in the production of a multiplied quantity of neutrons of relatively low energy, there being produced three or four neutrons of lesser energy per each incident high energy neutron.

Figure 7:
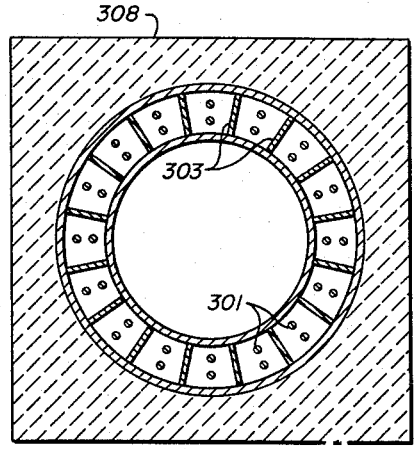
Figure 7 is a cross sectional view taken along the line 7—7 of Fig. 6.

Surrounding the target vessel 81 and secondary target 84 there is disposed a neutron absorbing lattice 86 (see Fig. 6) of appropriate fertile material and moderating material arranged in a regular geometric pattern. More particularly, lattice 86 preferably comprises a plurality of elongated fertile rods 301 assembled into bundles which extend lengthwise along the target vessel 81 to positions proximate secondary target 84. The bundles are in addition spaced circumferentially about the periphery of the target vessel. To facilitate mounting of the fertile rods 301 as well as to sectionalize the lattice longitudinally, a plurality of axially spaced annular plates 302 are secured concentrically about target vessel 81. Plates 302 are provided with axially aligned circumferentially spaced perforations to accommodate fertile rods 301. The lattice 86 is additionally sectionalized circumferentially by a plurality of axially elongated baffle plates 303 (see Fig. 7) radially secured to the periphery of target vessel 81 intermediate the bundles of fertile rods 301. The plurality of enclosures thus provided by plates 302, 303 provide multiple courses through which water or other suitable liquid coolant may be made to flow along the fertile rods 301, as by connecting the enclosures to piping of a suitable coolant distribution system (not shown). In the event water is utilized as the lattice coolant, the water coolant also serves as the moderator.

Figure 8:
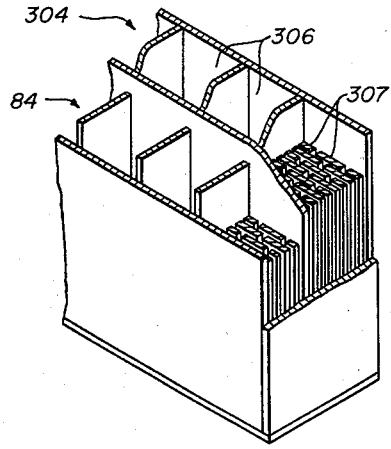
Figure 8 is a broken out perspective view partially in section illustrating in detail the end lattice structure of Fig. 6.

Lattice 86 is additionally provided with appropriate end structure 304 (see Fig. 8) in order to transversely enclose secondary target 84. Lattice end structure 304 may be variously provided and one advantageous configuration therefor includes a plurality of transversely spaced enclosures 306 secured to the exterior face of secondary target 84 and extending between the side sections of the lattice. Within enclosures 306 is disposed a plurality of plates 307 of the lattice fertile material and water coolant serving also as the lattice moderator is passed therethrough by appropriate connection to the coolant distribution system (not shown).

As regards suitable lattice fertile materials which may be employed in the construction of fertile rods 301 and fertile plates 307, it will be appreciated that the particular fertile material employed is dependent upon the desired end product which is to be produced in the electronuclear reactor of the present invention. In the event plutonium is to be produced, depleted uranium (0.3% $U^{235}$) is employed as the lattice fertile material. The copious quantities of neutrons produced at primary and secondary targets 83, 84 are slowed to thermal energies by the lattice moderator (e.g., coolant water) in order that such neutrons may be readily captured by the lattice fertile material. $U^{238}$, the primary constituent of the depleted uranium fertile material, accordingly absorbs the thermal neutrons and is transformed into plutonium. Similarly to produce tritium or $U^{233}$, the lattice fertile materials employed are respectively natural lithium and natural thorium. In order to process the artificially produced product produced by irradiation of the fertile material, the fertile rods 301 and fertile plates 307 are removable and means (not shown) may be advantageously provided to facilitate periodic automatic removal and recharging thereof.

It is to be noted that the preferred structure for lattice 86 described above is but one lattice configuration which may be employed in the electronuclear reactor of the present invention. Various suitable alternative structures will suggest themselves to those skilled in the art and in this connection it will be appreciated that in place of the coolant water moderator, various other moderating materials, e.g., graphite, heavy water, and the like may be employed with the foregoing as well as other fertile materials in a lattice arrangement.

In order to conserve neutrons and reduce the inventory of fertile material in lattice 86, a reflector 308 is mounted in peripheral enclosing relation thereto. Reflector 308 is fabricated from a neutron reflecting material such as graphite, beryllium, beryllium oxide, or the like, and accordingly is effective in reflecting neutrons inwardly to the lattice 86 where they contribute to the production of the desired end product.

To maintain an evacuated condition of the tank 11 during times when it is necessary to have the target vessel 81 or the cylindrical section 82 at atmospheric pressure, a quick closing valve 91 is mounted in the cylindrical section between the precessor 88 and the closure plate 14 of the tank. Also, an air lock gate 92 is mounted between the quick closing valve 91 and the tank 11 and a shield gate 93 is mounted between the precessor 88 and the target vessel 81. Such shield gate 93 provides radiation shielding between the target vessel 81 and the accelerator portion of the apparatus.

A plurality of main oscillators 101 are provided to develop a high power and high frequency acceleration voltage. Such main oscillators 101 are identical, one to the other, and only one is described in detail hereinafter. A high power oscillator tube 102 is connected with the anode coupled to a coaxial transmission line 103 through a capacitor 104 and a series inductance 106 with a shunt capacitance 107. Such transmission line 103 is extended through the wall of the tank 11, in a conventional airtight manner, and through an opening 108 in the liner 17 where termination is provided in a radio-frequency coupling loop 109. The series inductance 106 and shunt capacitance 107 have values which establish an artificial transmission line of one-quarter wavelength at the frequency of oscillation of the tube 102. With the transmission line 103 established at one-quarter wavelength at the same frequency, the anode of the tube 102 and the coupling loop 109 are electrically one-half wavelength apart for maximum transfer of energy. To drive the oscillator tube 102 a similar transmission line system, comprising a one-quarter wavelength coaxial transmission line 111 with a coupling loop 112 connected at one end within the resonant cavity 21 and a series inductance 113 and shunt capacitance 114 connected at the other end, is connected to the cathode of the tube. The values of the cathode-connected series inductance 113 and shunt capacitance 114 are established to provide a suitable value of positive feedback voltage to the oscillator tube 102 which sustains the oscillations.

To impress a required high value of operating voltage upon the oscillator tube 102 a main power supply 116 is provided with the negative terminal 117 connected to ground and the positive terminal 118 connected through a radio-frequency choke coil 119 to the anode of the tube.

With high frequency excitation of large resonant cavities to high values of voltage, certain phenomena occur which require additional equipment to overcome. The referenced phenomena, along with a similar resonant cavity excitation system, are set forth in a detail in the copending application for U.S. Letters, Patent, Serial Number 419,124, filed March 26, 1954, by William R. Baker et al., now Patent No. 2,868,574. Thus, to rapidly establish excitation within the resonant cavity 21, there is provided a plurality of pre-exciters 121. Each of the pre-exciters 121 is similar, one to the other, and only one is described in detail hereinafter. As a principal component of the pre-exciter 121, a shielded-grid oscillator tube 122 is connected with the cathode electrically tied to ground. The anode of such tube 122 is connected to a pulsed power supply 123 through a radio-frequency choke coil 124 with a by-pass capacitor 126 connected in shunt across the output of the power supply. The pulsed power supply 123 delivers a pulse of voltage having a steep wavefront and a substantially constant maximum value of several millisecond's duration, such as is developed by the discharge of a charged artificial transmission line. A coupling capacitor 127 is connected between the anode of the pre-exciter oscillator tube 122 and a combination of a shunt capacitance 128 and series inductance 129. A quarter-wave coaxial transmission line 131 is connected at one end to the series inductance 129 and is extended, in a vacuum-seal manner, through the wall of the tank 11 and through the liner 17 to terminate in a coupling loop 132 within the resonant cavity 21. Here again, the series inductance 129 and shunt capacitance 128 in combination with the quarter-wave coaxial transmission line 131 are electrically one-half wavelength. A variable inductance 133 is connected in shunt across the input end of the transmission line 131 and provides variation in the electrical length of such transmission system so that harmful feedback is prevented under certain conditions of excitation of the resonant cavity 21, as will be described hereinafter. A control grid circuit 136 is connected to the control grid of the oscillator tube 122 and comprises a bias network 137 and a neutralizing network 138 with a coupling capacitor 139 coupled to the anode circuit of the tube.

To prevent the output of the pre-exciter 121 from exceeding the pre-excitation level, a pick-up loop 141 is disposed within the resonant cavity 21 and a coaxial transmission line 142 connected to the loop is extended through the liner 17 and through the wall of the tank 11 in a vacuum-seal manner. Externally of the tank 11 the transmission line 142 is connected to a control circuit 146. The voltage of the pick-up loop 141 is passed through the control circuit 146 and connected by a coaxial transmission line 147 to a limiting and driving amplifier 151 where the amplitude of the voltage is prevented from exceeding a predetermined value. The output of the amplifier 151 is connected to a coaxial transmission line 152 to the control grid of the oscillator tube 122 in the pre-exciter 121. Such latter connections provide suitable drive voltage for the oscillator tube 122 and maintain a selected excitation level in the resonant cavity 21 during operation of the tube.

The control circuit 146 provides, by a connecting conductor 156, a control voltage to the control grid of the oscillator tube 102 of the main oscillator 101. Such control voltage renders the oscillator tube 102 conductive to provide radio-frequency voltages during the time operating voltage is applied to the anode of the tube. The control circuit 146 also provides, by a second connecting conductor 157, a control voltage to the main power supply 116.

A sub-exciter power supply 161 is provided with the negative output terminal 162 connected to ground and with a diode 163 connected between the positive output terminal 164 and the positive terminal 118 of the main power supply 116. The diode 163 is connected to prevent the high voltage of the main power supply 116 from reaching the sub-exciter power supply 161; that is, the anode of the diode is connected to the positive output terminal 164 of the sub-exciter power supply and the cathode of the diode is connected to the positive terminal 118 of the main power supply. The control circuit 146 also provides, by a third connecting conductor 166, a control voltage to the sub-exciter power supply 161.

For automatic operation of the excitation system for the resonant cavity 21, the control voltages of the conductors 156, 157, and 166 are developed by the control circuit 146 in a conventional manner in response to the feedback voltage of the transmission line 142. Suitable delays are incorporated in the various control voltage circuits to provide the sequence of operation of the components of the excitation system which is set forth in detail hereinafter. For manual operation of such excitation system the control voltages are readily applied by suitable power supply and switch combinations (not shown).

Figure 2:
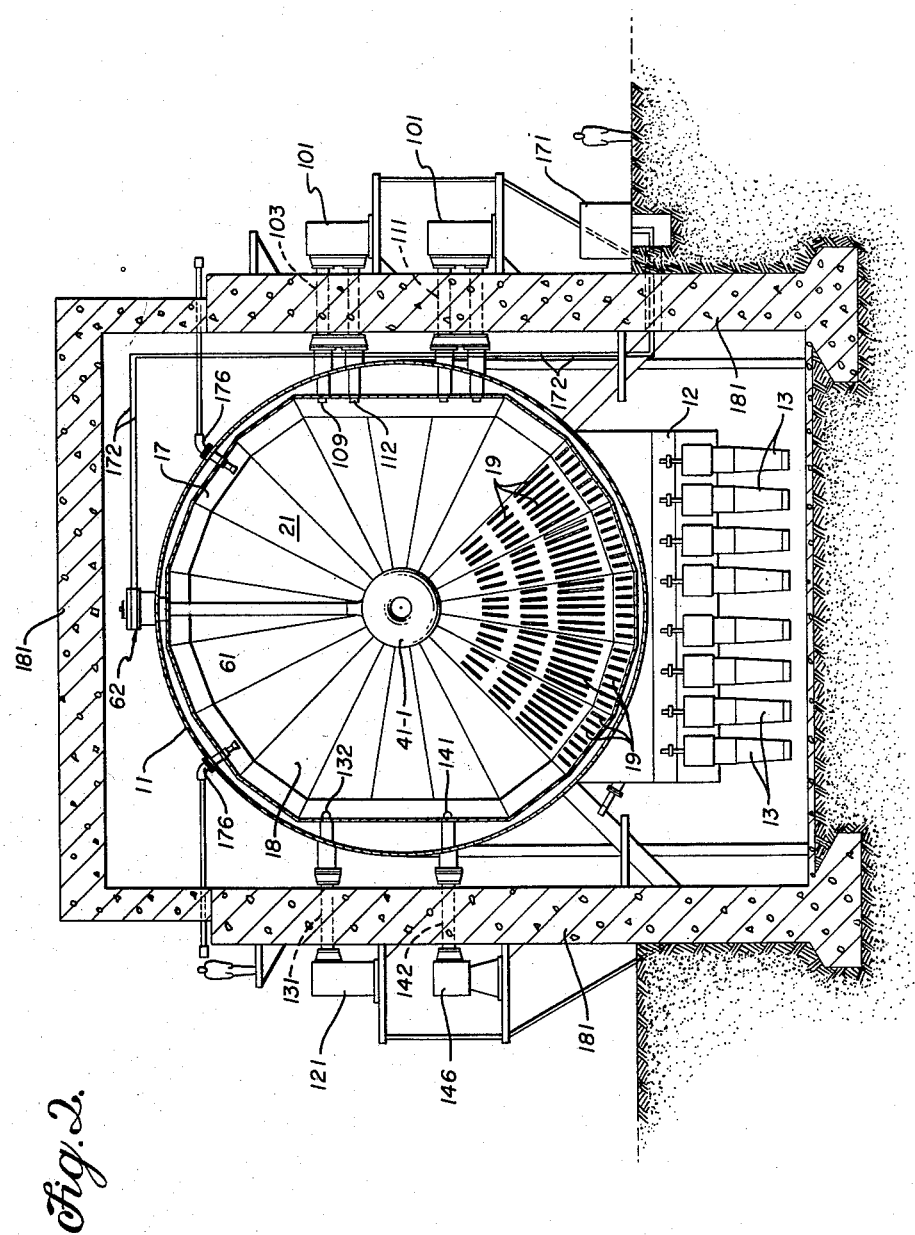
Figure 2 is a tranverse section of the electronuclear reactor taken along the line 2—2 of Fig. 1.

To suitably excite the solenoidal magnet winding 52 of the drift tubes, 41-1 to 41-8, a plurality of high current, low voltage, direct current power sources 171 (see Fig. 2) are provided. The outputs of such power sources 171 are connected by feeder lines 172 to the conductors 53 of magnet windings 52. Visual aid in aligning the drift tubes, 41-1 to 41-8, during installation is provided by periscopes 176 extended through the wall of the tank 11 and the liner 17.

As a protection to workers the tank 11 and the lattice reflector 308 are enclosed by suitable radiation shielding 181 with a portion of such shielding extending between the tank and lattice. Also there is provided a complex interlock and protective electrical system (not shown) to assure proper operation and protection from high voltage faults of the entire apparatus.

Now consider the operation of the present invention with the structure assembled according to the foregoing description and with the assembly suitably evacuated by the vacuum pumps 13 and vacuum system 29. The pulsed power supply 123 of the pre-exciters 121 is energized to rapidly impress operating voltage upon the oscillator tube 122. The pre-exciters 121 then develop a radio frequency voltage which is coupled to the resonant cavity 21 by the tranmission lines 131 and the coupling loops 132 and thereby excite the cavity to a pre-excitation level. Such pre-excitation level is a value of voltage above the multipactoring and ion lock levels of the resonant cavity 21 and is reached by a rate-of-rise of voltage of at least 2000 volts per microsecond.

After the pre-excitation level has been attained, but before the output of the pulsed power supply 123 decays, the control circuit 146 provides a control voltage by the conductor 166 to initiate operation of the sub-exciter power supply 161. Such sub-exciter power supply 161 impresses an operating voltage at the anode of the oscillator tube 102 of the main oscillators 101. The radiofrequency output of the main oscillators 101 is then coupled to the resonant cavity 21 to sustain the excitation at about the same level as provided by the pre-exciters 121. Thus the pre-excitation and sub-excitation levels of the resonant cavity are substantially the same value which is above the multipactoring and ion lock levels.

To protect the pre-exciters 121 from feedback voltages along the transmission lines 131, it is necessary to decouple the pre-exciters from the resonant cavity 21. Such decoupling is readily accomplished by changing the value of the variable inductance 133 in the pre-exciters 121 from a minimum value (maximum coupling) to a maximum value (minimum coupling). After such decoupling has been accomplished the main power supply 116 is turned on by a control voltage from the control circuit 146, as delivered by the conductor 157, to impress a value of high voltage upon the main oscillators 101. The output of the main oscillators 101 increases to excite the resonant cavity 21 to the final high level of excitation. The diode 163, as has been stated previously, prevents the high value of voltage of the main power supply 116 from reaching, and therefore damaging, the sub-exciter power supply 161.

When the operation of the accelerator is not continuous, the main power supply 116 is pulsed so that the resonant cavity 21 is excited to the level established by the sub-exciter power supply 161 between pulses. If, for any reason, the level of excitation of the resonant cavity 21 falls below that established by the sub-exciter power supply 161, the procedure set forth above which includes the pre-exciter 121 must be followed in re-establishing the excitation of the cavity.

As stated previously the excitation of the resonant cavity 21 is in the $TM_{010}$ mode in which the magnetic field is circumferential and the electric field extends from end-to-end of the resonant cavity parallel to the axis. To provide such mode the coupling loops 109 and 132 are disposed within the resonant cavity so that the magnetic fields are parallel to the circumference of the cavity.

Now, with the resonant cavity 21 suitably excited in accordance with the foregoing, the direct current power sources 171 are turned on to energize the solenoidal winding 52 of the drift tubes, 41-1 to 41-8. Also, the precessor 88 is energized to establish a rotating magnetic field between the accelerator and the target vessel 81. Next the power supply 39 of the ion injector is turned on and gas from the gas source 37 flows into the ion source 36 where such gas is converted into a copious supply of positively charged ions. The accelerating electrode structure 38 withdraws the ions from the ion source 36 and projects the ions in a beam along and substantially parallel to the axis of the resonant cavity 21. Thus, the ions of the beam reach the first drift tube 41-1 with an initial (injection) energy.

Since the drift tubes, 41-1 to 41-8, are disposed coaxially with respect to the axis of the resonant cavity 21 and the beam travels a path along such axis, there are spaced-apart lengths of the path of the beam which are free of electrical fields. It is to be noted that the drift tubes, 41-1 to 41-8, increase in length progressively from the ion injector 26 end of the resonant cavity 21 and that the length of the gap between successive drift tubes similarly increases. The lengths of the drift tubes, 41-1 to 41-8, and the lengths of the gap therebetween are readily calculated with formulae well known in the linear accelerator field so that the ions of the beam are accelerated in traversing the gaps.

The magnetic field established parallel to the path of the beam within the drift tubes, 41-1 to 41-8, by the solenoidal magnet winding 52 of each drift tube provides a focusing force upon the particles of the beam as has been described in detail in the foregoing. Thus, the beam of ions is accelerated with minimum losses to the exit opening 76 of the resonant cavity 21 where the beam has attained maximum energy. The beam of ions then proceeds to the precessor 88 where it is continuously deflected in a varying manner by the moving magnetic field. The resultant beam of ions then impinges upon the primary target 83 and various nuclear reactions (i.e., evaporation, spallation, and stripping reactions) occur between the high energy ions and the target material with an attendant production of very high energy neutrons. A large portion of the high energy neutrons then proceeds to secondary target 84 where neutron multiplication occurs through spallation reactions and the like with the secondary target material and a stream of less energetic neutrons is produced with some attendant production of the desired material. The multiplied quantity of less energetic neutrons together with the remaining small portion of the high energy neutrons produced at primary target 83 then bombard the lattice 86 wherein the neutrons are moderated to thermal energies by the moderator as previously described. The thermal neutrons are readily captured by the fertile material rods 301 and plates 307 and a substantial portion of such fertile material is transformed by neutron absorption reactions into the desired end material. Substantially all neutrons passing through the lattice without being captured are reflected from reflector 308 back into the lattice and are ultimately captured by the lattice fertile material resulting in the efficient transformation thereof. Periodically, the irradiated fertile rods 301 and plates 307 together with secondary target 84 are removed and the desired end material extracted therefrom by appropriate processing. Finally, the less energetic neutrons are captured by the lattice 86 where additional production of the desired material occurs.

As an example of the foregoing, the following is a list of the more important dimensions and other data for an electronuclear reactor constructed to produce plutonium. Such list is merely typical and is not to be considered limiting in any manner.

| | |
|---|---|
| Tank diameter | 60 ft. |
| Resonant cavity diameter | 57.4–51.5 ft. |
| Resonant cavity length | 60 ft. |
| Resonant frequency of cavity | 12.1 megacycles. |
| Pre-excitation level | 25 mv. |
| Number of pre-exciters | 2. |
| Sub-excitation level | 2–4 mv. |
| Main excitation level | 45 mv. |
| Number of main oscillators | 8. |
| Drift tube gap-to-repeat length ratio | 0.25. |
| Gas to be ionized | Deuterium. |
| Injected beam particles | Deuterons. |
| Injection voltage | 80 kv. |
| Average beam current (during pulse) | 250 ma. |
| Beam pulse duration | 25 milliseconds. |
| Beam pulse repetition rate | 8 per second. |
| Maximum particle energy | 30 mev. |
| Primary target material | Uranium (depleted to 0.3% $U^{235}$). |
| Secondary target material | Uranium (depleted to 0.3% $U^{235}$). |
| Lattice fertile material | Uranium (depleted to 0.3% $U^{235}$). |
| Lattice moderator | Water. |

It has been determined by an electronuclear reactor constructed in accordance with the foregoing that particles are accelerated with a high degree of efficiency in the linear accelerator having magnetic focusing solenoids associated with the drift tubes. Also, it has been demonstrated that costs of production of artificially produced materials with such a reactor are commercially competitive with other known types of reactors.

While the salient features of the present invention have been described in detail with respect to one embodiment it will be apparent that numerous modifications may be made within the spirit and scope of the invention, and it is therefore not desired to limit the invention to the exact details described and illustrated except insofar as they may be defined in the following claims.

What is claimed is:

1. In an electronuclear reactor, the combination comprising a source of a beam of charged particles, means disposed to receive and accelerate said beam to high energy, a target vessel disposed to receive the charged particle beam as accelerated, a primary target disposed within said vessel to intercept said beam and of a material which undergoes nuclear reactions with the accelerated charged particle beam with an attendant production of high energy neutrons, a secondary target mounted exteriorly of said vessel in parallel spaced apart relation to said primary target and of a material which undergoes nuclear reactions in response to high energy neutron bombardment with production of a multiplied quantity of lesser energy neutrons, a neutron absorbing lattice mounted about the periphery of said target vessel and in enclosing relation to said secondary target, said lattice including a moderator and removable rods of a fertile material for nuclear transformation to an artificially produced material arranged in a regular geometric pattern, a neutron reflector mounted in enclosing relation about the periphery of said lattice, and a neutron protective shield mounted in enclosing relation about said reflector.

2. In an electronuclear reactor, the combination comprising an ion injector including a source of ions and means for forming said ions into a beam having an initial energy; a linear accelerator disposed to receive said beam and accelerate the ions thereof to high energy, said accelerator having a plurality of drift tubes with electromagnetic beam focusing means to prevent beam loss from radial defocusing forces; a target vessel disposed to receive the ion beam as accelerated and focused including a primary target disposed to intercept said beam, said primary target of a material which undergoes nuclear reactions with said ion beam with an attendant production of high energy neutrons; a secondary target mounted in parallel spaced apart alignment to said primary target and receiving a large portion of said high energy neutrons, said secondary target of a material which undergoes nuclear reactions in response to high energy neutron bombardment with production of a multiplied quantity of lesser energy neutrons; a lattice disposed to encase said primary and secondary targets in receiving relation to said neutrons, said lattice including a moderator to slow said neutrons to thermal energies and fertile material to capture the resulting thermal neutrons with a nuclear transformation of the fertile material to an artificially produced material; and a beam deflector disposed between said accelerator and said target vessel including means for continuously moving said beam across said primary target in a repetitive path.

3. In an electronuclear reactor as defined by claim 2, the combination further defined by said ions being deuterons, the primary and secondary target materials being natural uranium depleted to 0.3% $U^{235}$, said moderator being water, said fertile material being natural uranium depleted to 0.3% $U^{235}$, and said artifically produced material being plutonium.

4. In an electronuclear reactor as defined by claim 2, the combination further defined by said ions being deuterons, the primary and secondary target materials being natural uranium depleted to 0.3% $U^{235}$, said moderator being water, said fertile material being thorium, and said artificially produced material being $U^{233}$.

5. An electronuclear reactor comprising an ion injector including a source of positive ions and means for forming said ions into a beam having an initial energy; a linear accelerator disposed to receive said beam and accelerate the ions thereof to high energy, said accelerator having a plurality of drift tubes with electromagnetic beam focusing means to prevent beam loss from radial defocusing forces; a target vessel communicably attached to said accelerator in receiving relation to said ion beam as accelerated and focused; a primary target disposed within said target vessel to intercept said beam, said primary target being of a material to convert the incident ions of said beam to high energy neutrons; a beam precessor disposed between said accelerator and said target vessel to continuously move said beam across said primary target in a repetitive path; a secondary target disposed in parallel spaced apart alignment with said primary target to receive at least a portion of said high energy neutrons, said secondary target being of a material to produce a multiplied quantity of lesser energy neutrons in response to bombardment by said high energy neutrons; a neutron absorbing lattice disposed in encasing relation to said primary and secondary targets and including a moderator to slow said neutrons to thermal energies and rods arranged in a regular geometric configuration, said rods being of a fertile material to capture the thermal neutrons with a nuclear transformation of the fertile material to an artificially produced material; a neutron reflector mounted in encasing relation to said lattice to reflect neutrons inwardly thereto, and neutron shielding means disposed about said reflector to capture neutrons penetrating therethrough.

6. An electronuclear reactor comprising an acceleration chamber, a deuteron source disposed to project a beam of deuterons along a linear path through said chamber, means coupled to said chamber establishing a radiofrequency electric field parallel to said path, a plurality of drift tubes disposed in said chamber in spaced-apart relation along said path to provide a series of electric field-free passages for said beam, a plurality of solenoidal electromagnets respectively disposed about said drift tubes to provide magnetic fields parallel to said path within said drift tubes, a plurality of direct current sources respectively connected to said electromagnets, a target vessel disposed in axially aligned communication with said chamber along said path, a depleted natural uranium primary target disposed within said vessel transversely to said path, a beam precessor mounted along said path between said chamber and said target vessel to continuously deflect said beam across said primary target in a repetitive path, a depleted natural uranium secondary target mounted exteriorly of said target vessel in parallel spaced-apart relation to said primary target, a neutron absorbing lattice mounted about the periphery of said target vessel and in enclosing relation to said secondary target, said lattice including a moderator and removable rods of a fertile material for nuclear transformation to an artificially produced material arranged in a regular geometric pattern, a neutron reflector mounted in enclosing relation about the periphery of said lattice, and a neutron protective shield mounted in enclosing relation about said reflector.

References Cited in the file of this patent

UNITED STATES PATENTS

| | | |
|---|---|---|
| 2,287,619 | Kallmann et al. | June 23, 1942 |
| 2,391,016 | Ginzton | Dec. 18, 1945 |
| 2,409,608 | Anderson | Oct. 22, 1946 |
| 2,500,223 | Wells et al. | Mar. 14, 1950 |
| 2,576,600 | Hanson | Nov. 27, 1951 |
| 2,597,542 | Strutt et al. | May 20, 1952 |
| 2,619,607 | Steers | Nov. 25, 1952 |
| 2,708,656 | Fermi et al. | May 17, 1955 |

FOREIGN PATENTS

| | | |
|---|---|---|
| 630,726 | Great Britain | Sept. 28, 1949 |

OTHER REFERENCES

"Physical Review," vol. 88, pages 1190–1199 (1952).

"High Energy Accelerators," book by M. S. Livingston, pages 86–92, 119–124. Publ. by Interscience Publishers, London (1954).

J. Mattauch, "Nuclear Physics Tables," Interscience Publishers (1946), N.Y., pages 128–131.

"Introduction to Nuclear Engineering," Richard Stephenson, McGraw-Hill Book Co., N.Y. (1954), page 47.